United States Patent [19]
Gau et al.

[11] 3,910,243
[45] Oct. 7, 1975

[54] ELECTRONIC SPARK TIMING ADVANCE AND EMISSION CONTROL SYSTEM

[75] Inventors: Leonard P. Gau, Birmingham; Donald E. Riley, Farmington; Ivor W. Carter, Detroit, all of Mich.

[73] Assignee: Chrysler Corporation, Highland Park, Mich.

[22] Filed: Jan. 9, 1973

[21] Appl. No.: 322,243

[52] U.S. Cl.... 123/117 R; 123/146.5 A; 123/148 E
[51] Int. Cl.² ........................................... F02P 5/04
[58] Field of Search ........ 123/117 R, 117 A, 179 B, 123/179 BG, 148 E, 146.5 A

[56] References Cited
UNITED STATES PATENTS

| | | | |
|---|---|---|---|
| 3,202,146 | 8/1965 | Short et al. .................. | 123/146.5 A |
| 3,314,407 | 4/1967 | Schneider ..................... | 123/148 E |
| 3,316,448 | 4/1967 | Hardin et al. ................. | 123/148 E |
| 3,592,178 | 7/1971 | Schiff .............................. | 123/117 R |
| 3,630,185 | 12/1971 | Struber ..................... | 123/148 MCD |
| 3,646,922 | 3/1972 | Spalding .................. | 123/146.5 A X |
| 3,738,339 | 6/1973 | Huntzinger et al. ......... | 123/148 E X |
| 3,749,070 | 7/1973 | Oishi et al. .................... | 123/117 R |
| 3,749,073 | 7/1973 | Asplund ......................... | 123/148 E |
| 3,752,139 | 8/1973 | Asplund ..................... | 123/148 E X |
| 3,756,212 | 9/1973 | Schirmer et al. ............... | 123/148 E |
| 3,757,755 | 9/1973 | Carner ........................... | 123/117 R |
| 3,811,420 | 5/1974 | Vogel............................ | 123/117 R |
| 3,853,103 | 12/1974 | Wahl et al..................... | 123/117 R |
| 3,867,916 | 2/1975 | Bigalke .......................... | 123/117 R |

OTHER PUBLICATIONS
Motorcraft Shop Tips, Vol. 10, No. 1, Sept., 1971, per pp. 6 and 7.

Primary Examiner—Charles J. Myhre
Assistant Examiner—Tony Argenbright
Attorney, Agent, or Firm—Talburtt & Baldwin

[57] ABSTRACT

An electronic spark timing advance and emission control system for a pulsed electronic ignition control unit for emission controlled internal combustion engine includes a distributor having a pair of speed responsive, signal generating pickups and a pair of electronic spark timing control channels each of which is excited by a different one of the pickups. One of the channels is operative only during engine starting intervals and triggers the electronic ignition control unit with pulses of fixed or invariable timing at the optimum starting angle of the engine in advance of the TDC position thereof. The other channel is a variable timing control channel, which is operative after starting and during engine idle and run conditions, and provides ignition triggering pulses whose occurrence in time is varied from the TDC engine position at engine idle to provide any desired degree or requisite amount of spark timing advance or retardation therefrom during off-idle engine operating conditions in accordance with various engine operating parameters, including engine speed and manifold vacuum.

Additional control over the engine timing for further reduction of vehicle exhaust emissions is provided in the form of an electronic time delay circuit, which is operative above a predetermined ambient temperature and for a predetermined time interval to delay the advance otherwise called for by the manifold vacuum advance signal during the transition from a vehicle load or acceleration condition to a no-load or vehicle cruising condition.

25 Claims, 8 Drawing Figures

ELECTRONIC SPARK TIMING ADVANCE AND EMISSION CONTROL SYSTEM

This invention relates to electronic spark timing advance controllers for electronic ignition equipped internal combustion engines and, more particularly, to an electronic spark timing advance controller which provides both a variable and a fixed amount of spark advance of the spark timing for an emission controlled internal combustion engine.

Reference is made herein to copending U.S. Pat. No. 3,748,974, filed June 1, 1971 and Ser. No. 322,577 filed of even date and of common ownership herewith for disclosures of an inductive type pulsed electronic ignition system and of an electronic spark timing advance controller, respectively, of the above mentioned classes.

The apparatus of the present invention includes a pair of electrical spark timing control channels, one of which serves to vary the engine spark timing from an initial setting or the TDC position of the engine in accordance with engine speed and pressure. The other timing control channel is operative only during engine starting conditions and advances the engine spark timing from its aforesaid initial position to a position whose occurrence in time corresponds to the optimum starting angle of the engine. The starting angle or position of the engine may be displaced as much as 10° or more in advance of or before the TDC position of the engine at which it is desired to operate or fire the engine during idle running conditions for emissions reduction purposes. The fixed and the variable timing controllers are interrelated through an operator controlled transfer or override circuit, whereby the engine is operated from the fixed channel at the advanced starting angle or position during starting for improved engine startability and from the variable timing channel to permit the engine to be operated at a retarded angle relative to the starting angle during engine idle for emissions reduction purposes, and at either an advanced or a retarded angle from the TDC position of the engine after starting and during other engine running conditions in accordance with various engine operating indicia.

The fixed and the variable timing relationships are derived from a pair of timing control channels each excited from a different one of a pair of start and run pickup coils, which are associated with a common reluctor wheel and have a predetermined angular relationship to each other and to the TDC and the starting angle positions of the engine.

The variable or spark timing advance control is accomplished by waveform comparison between a pair of electrical signals, one of which represents instantaneous engine rotational position and is modulated by additional electrical signals which may vary in accordance with engine speed and manifold vacuum modified in accordance with predetermined speed and vacuum advance programs. The other electrical signal used for the comparison is a fixed level reference signal, which has a predetermined relationship to the unmodulated engine position signal at a first predetermined angular position, normally TDC, of the engine.

The engine position signal is developed by successively shaping, averaging and intergrating the pulses generated by the run pick up device responsive to engine speed and is reset from the shaped run pickup pulses, which are generated every $4\omega/C°$ of engine crankshaft rotation, where $\omega = 2\pi$ radians or 360° and $C$ is the number of cylinders in the engine.

The fixed or invariable timing control is established from the start pickup, which is employed with an operator controlled transfer circuit during engine starting operation and supplies pulses from a pulse shaping means to trigger the electronic ignition unit at the optimum starting angle of the engine, a few degrees in advance of or before the TDC position thereof.

Another feature of the invention resides in the provision in the subject electronic spark timing advance controller of an electronic time delay circuit, which is operative above a predetermined ambient temperature to delay the immediate application of the change in spark timing advance called for by the manifold vacuum advance signal during the transition from a vehicle load or acceleration condition to a vehicle no-load or cruising condition. This feature has utility in the reduction of $NO_x$ components of vehicle exhaust emissions that are generated during the above described vehicle operating conditions.

The various features and advantages of the invention will be best understood by reference to the following technical specification in which an illustrative embodiment is set forth in detail. This specification is to be taken with the accompanying drawings of which:

Figure 1:
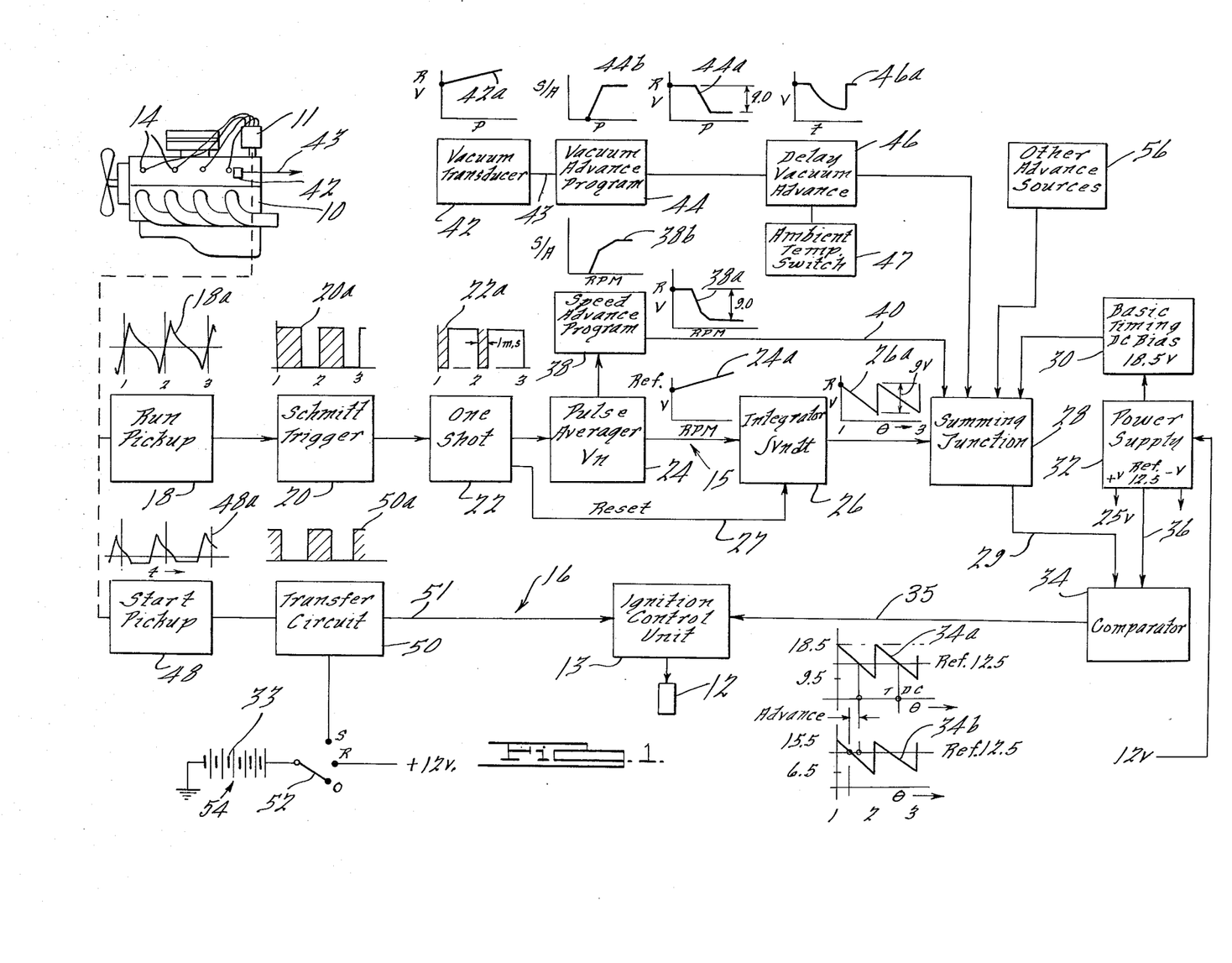
FIG. 1 is a block diagram of the illustrative embodiment of the invention.

Referring now to FIG. 1, the illustrative embodiment of the present invention will be described with reference to a block diagram in which the various legends and waveform indications will convey a general understanding of the organization of the invention and from which a better understanding of the detailed schematic circuit diagram of FIG. 5 may be obtained. In FIG. 1, the operation of an internal combustion engine 10 of the conventional four-cycle multicylinder piston type is controlled by means of an engine ignition system, which includes a distributor 11, ignition coil 12 and a pulsed electronic control unit 13 and serves to generate ignition trigger signals or ignition pulses and to apply these pulses to the ignition or engine spark plug devices 14 in the proper sequence and at the proper time in relationship to the rotation position of the engine. The ignition control unit 13, which is a contactless or pulsed inductive type electronic ignition controller based on that shown in U.S. Patent 3,478,974, is shown in FIG. 1 to be controlled by separately operated ignition timing channels 15 and 16 of which the timing channel 15 is constructed and arranged to provide ignition timing variations in accordance with selected engine operating parameters, as speed and pressure. The timing channel 16, on the other hand, is a fixed timing system, which is operable only during the starting or cranking phase of operation of the engine 10 and, when operative, is effective to override the run channel 15 in its effect on the ignition control unit 13.

The variable timing channel includes a run pickup 18, which generates bipolar pulses of an alternating waveform as shown at 18a and having an occurrence rate related to the rotational rate of an engine distributor component and, thus related to the rate of rotation or speed of the engine. The distributor is customarily driven by the engine camshaft at one-half of crankshaft speed, whereby 90° engine crankshaft rotatiion is equivalent to 45° of camshaft rotation.

The pulses produced by the distributor run pickup 18 are applied to a Schmitt trigger circuit 20 which is triggered at the negative to positive going zero crossover point of the voltage waveform 18a of the pickup 18 whose position is adjusted relative to a cooperating reluctor element on the distributor rotor shaft so that the pulse crossover point occurs at a preselected reference angle, say 60°, from the TDC position of the engine. The output 20a of the Schmitt trigger is a pulse train of a frequency or repetition rate established by the pulse rate of the pickup waveform 18a and of a pulse width which varies directly with engine speed.

The output 20a of the Schmitt trigger circuit 20 is applied to a constant energy pulse generator as a monostable multivibrator 22, commonly called a "one-shot", the output 22a of which is a series of pulses of fixed width independent of speed, but having an occurrence rate which is related to the speed of the rotation of engine 10. The fixed width pulses in the output of 22a of the monstable multivibrator 22 are applied to a pulse averaging circuit 24 such that the output 24a of the averaging circuit 24 is a dc voltage VN, which is directly proportional to engine speed and varies in amplitude from a fixed reference value in accordance with the angular rate $\omega = d\theta/dt$ of the engine 10.

To convert the speed related dc signal 24a from the pulse averager 24 to a dc signal proportional to instantaneous engine angular position $\theta$, the signal 24a is applied to an integrator 26, which, in the case of an 8 cylinder engine, is reset every 90° of engine crankshaft or 45° of camshaft rotation by a reset signal appearing on reset line 27 from the monstable multivibrator 22. In the case of a six cylinder engine, the integrator would be reset every 120° of engine rotation or 60° of camshaft rotation.

The integrator circuit operates to provide a decreasing or negative going dc signal 26a, which as of fixed slope varies in instantaneous amplitude from a fixed reference voltage in accordance with engine rotational position. This repeating, varying amplitude position signal is applied to a summing device as a current summing junction 28 along with a basic timing dc bias voltage 30, which is derived from power supply source 32 and serves to establish the basic timing relationship of the variable timing channel 15 at the intitial or TDC position of the engine as described below. Source 32 is powered from the vehicle storage battery 33 and is a D.C. to D.C. converter supplying a +25 volt operating voltage labelled +V for the integrated circuit operational amplifiers employed in the system, a +12.5 volt reference signal voltage labelled REF., and a signal ground level voltage labelled —V.

The algebraic sum of the instantaneous value of the position waveform 26a from the integrator 26 and the dc bias basic timing voltage is applied from the summer 28 over line 29 to one of the inputs of a comparator circuit 34, whose other input receives the +12.5V. reference voltage, which is of a reference level different from the basic timing bias voltage by way of line 36 from source 32. Whenever the summed signal from junction 28 is equal to the reference voltage applied by way of line 36, the comparator circuit 34 produces an output signal which is applied over line 35 to the solid state ignition control unit 13. The ignition control unit 13, in turn, produces a high-voltage ignition pulse which is applied to the distributor coil 12 as indicated in FIG. 1.

In an illustrative embodiment of the arrangement of FIG. 1, the dc bias level is derived from voltages supplied by source 32 and is selected as 18.5 volts, and all other reference voltages in the system of FIG. 1, including the reference applied to the comparator 34 by way of line 36, are set at 12.5 volts. The position waveform integrator 26 is reset to the 12.5 volt reference every 90° of engine crankshaft rotation at the aforesaid reference angle corresponding to the 60° BTDC position of the engine and proceeds in the negative or decreasing direction with increasing engine position to a voltage level 9 volts below the reference voltage level at a point in space and time located and occurring ATDC 30°/(after) of the engine. Therefore, when the 18.5 volt dc bias from the source 30 is reduced by 6 volts by the negative going engine position signal 26a of the integrator 26, the output of the current summing junction 28 equals 12.5 volts dc and, thus, is equal to the 12.5 v reference level applied to the comparator 34 by way of line 36 from power supply 32.

This equality of voltages is indicated in waveform 34a shown in FIG. 1 wherein the position signal V$\theta$c is shown as a repeating, negative going constant slope signal which crosses or equals the 12.5 volt reference level at the top dead center (TDC) position of the engine 10. The comparator 34, thus produces a signal at the top dead center position resulting in an ignition pulse at this time, which represents the 0° advance position or firing angle at which no advance of the engine timing is desired.

The system of FIG. 1 is designed and implemented in such a fashion as to accomplish the basic engine timing control functions which are related to engine operating conditions, such as speed and pressure. In addition, the system of FIG. 1 is designed and implemented in such a fashion as to also accommodate and account for any other monitored quantities which have a bearing upon engine timing selection.

Referring specifically to FIG. 1, it can be seen that the dc output of the pulse averager circuit 24 is applied not only to the integrator circuit 26 to derive a position signal 26a, but also to a speed governor signal scaling circuit 38 having a segmented or discontinuous volt-to-volt transfer function, illustrated at 38a in FIG. 1. The output of the speed governor circuit 38 is connected by way of line 40 to the current summing junction 28 thereby to modulate the position waveform 26a from the integrator circuit 26 in accordance with engine speed. As indicated in the waveform 38a in FIG. 1, the output of the speed governor circuit 38 is at the reference level of 12.5 volts under low-speed conditions and decreases negatively from the reference level with increasing speed conditions. The discontinuous transfer characteristic of the waveform 38a is readily accomplished by means of diode-biased operational amplifier circuitry as will hereinafter be described in detail. It can be seen that the negative going charateristic of the waveform 38a with increasing engine speed is such as to produce a net decrease or decrement in the amplitude of the position waveform 26a without effecting its slope as shown at 34b, thereby to advance engine ignition pulse timing with increases in vehicle speed beyond the predetermined or basic initial level established by the waveform 34a.

In addition to timing variation in response to speed, the system of FIG. 1 is also adapted to modulate timing in accordance with engine load as manifested by the pressure conditions in the intake system of the engine 10. To accomplish this, a suitable vacuum transducer 42 is disposed in the engine air intake manifold and is operative to produce a dc signal which is in proportion to pressure in pounds per square inch, as shown at 42a. This output signal is applied over line 43 to a vacuum advance program signal scaling circuit 44 having a voltage-psi transfer function 44a, as illustrated in FIG. 1. Again it can be seen that with increasing pressure conditions, the voltage level of waveform 44a drops off 9 volts from the 12.5 v. reference value. This programmed voltage from the vacuum advance program circuit 44 is also applied, either directly or through a delay vacuum advance unit 46 later to be described, to the summing junction 28 in such a fashion as to modulate by dc variation the instantaneous amplitude of the negative going engine position waveform 26a. Again the reduction in the dc level of the waveform 44a from the reference level operates to lower the sum of the signals applied to the junction 28 thus, to advance the position at which the modulated engine position waveform signal crosses the 12.5 volt reference level in the waveform diagram of 34b.

Looking further to the circuit of FIG. 1, it can be seen that the starting or cranking timing system 16 comprises a second transducer or pickup 48 for producing a waveform 48a whose negative alternations are limited or clipped as shown and whose occurrence rate is related to the mechanical operating rotational rate of the engine 10. The pickup 48 is preferably disposed in the engine distributor along with the pickup 18 to share the same reluctor or pulsing element therewith, but is otherwise electrically separate and independent therefrom. The pickup 48 is connected to a transfer circuit 50 of the monostable type for producing an output pulse train 50a of voltage pulses which occur at a fixed angular or timing position and at rate related to engine speed.

As shown in FIG. 1, the transfer circuit 50 is enabled only when the engine 10 is undergoing starting. This action is accomplished by an operator controlled switch 52, as the vehicle ignition switch, connected between the vehicle electrical power source 54, which includes the battery 33, and the transfer circuit, the switch 52 being closed only when the ignition key is turned to the "start" positions. The output of transfer circuit 50 is connected to the ignition control unit 13 in such a fashion as to override the effect of the signals from comparator 34 during a cranking operation. Accordingly, during any starting or cranking operation, timing is established in a fixed fashion by the output of the transfer circuit 50 as driven by the distributor start pickup 48, the angular position of which is adjusted relative to the reluctor wheel on the distributor rotor shaft to set the timing of the firing event in an engine cylinder at the aforementioned optimum starting angle of the engine in advance of the TDC position thereof.

The operation of the variable timing channel 15 may be understood from the waveforms 34a and 34b of which the waveform 34a illustrates the establishment of the basic or control timing relationship of the channel 15 to produce an ignition triggering pulse at the TDC position of a piston in a cylinder of the engine. The waveform 34a is shown as a repeating waveform decreasing a total of 9.0 volts in a substantially linear fashion from a peak value of 18.5 volts to approximately 9.5 volts after which it is reset every 90° of engine crankshaft rotation to the peak value corresponding to the level of the DC basic timing bias voltage. The 9.0 volt swing or reduction of the bias voltage is due to the position signal 26a from the integrator 26 which is applied to the summing junction 28 with the bias voltage. The 12.5 volt reference level REF, is the reference voltage applied from source 32 by way of line 36 to the comparator 34 and crosses the waveform 34a at a point 60° after the start or reset point of the position signal or at the TDC position of the engine, the position signal deriving its timing from the waveform 18a of the pulses from the run pickup 18 whose angular position is set in the distributor relative to the crankshaft position.

It can be seen from the waveforms 34a and 34b that the point of crossing between the waveform 34a and the 12.5 reference voltage REF may be varied in any 90° sector of engine rotation by shifting the position of the waveform 34a up or down relative to the reference level R. For example, the waveform 34b, which results from a decreased initial value in the modulated signal resulting from additional signals applied to the summing junction 28, crosses the 12.5 volt reference level earlier or at a lesser crank angle before TDC than does the waveform 34a, the difference in the crossing points between waveform 34a and 34b being approximately 10° of engine crankshaft or 5° of distributor camshaft rotation. Thus, assuming that the output of the speed governor circuit 38 and/or the vacuum advance circuit 44 applied to the summing junction 28 in FIG. 1 is such as to lower waveform 34b by the amount indicated, then the speed and/or vacuum signal is such as to accomplish a 10° advance in the ignition timing of the engine 10. Additional advance or retardation from TDC is accomplished by more negative or positive voltages, respectively, from the various advance sources indicated by block 56 in FIG. 1.

The aforementioned delay advance circuit 46 operates in conjunction with an ambient temperature switch 47 for emission control purposes at ambient temperatures above 68° F. and serves to delay the restoration of vacuum spark advance during the transition from a vehicle load or acceleration condition to a vehicle no-load or cruising condition.

During acceleration, the engine vacuum is low and substantially no vacuum spark-advance modulation of the engine timing is provided thereby, as indicated by the typical spark advance vs engine vacuum characteristic curve 44b of FIG. 1. After the vehicle has been accelerated to attain a desired cruising condition, the engine vacuum is restored to call for substantially full or maximum vacuum spark advance. The sudden restoration of full spark advance under these conditions results in the attainment of high temperatures within the engine cylinders and the generation of undesirable emission components including $NO_x$. By delaying the restoration of the spark advance during the aforesaid vehicle operating condition, the heat rejection of the engine into the exhaust is increased and the temperature peaks within the engine cylinder are reduced, thereby reducing the exhaust emission components during these periods. The delay advance controller provides the desired delay electronically and is essentially a time delay capacitor charging circuit, which provides a 10–15 second delay when the signal from the vacuum advance electronic program unit 44 drops or produces a change in logic signal level.

Looking now to FIGS. 2, 3, 3A and 4, a preferred construction of a distributor 11 bearing the pickups 18 and 48 of the sytem of FIG. 1 is shown in detail. The run pickup 18 is mounted within the lower housing 60 of the distributor in adjacent, but radially outwardly spaced relationship to an inwardly located reluctor wheel, also called a star wheel, 61 of ferrous material, which is centrally mounted for rotation within the distributor on a driveshaft 62. Star wheel 61 comprises a total of eight uniformly, angularly spaced teeth and is rotatable with shaft 62 in proportion to the rotation of the crankshaft in the eight cylinder engine 10. For a six cylinder engine, the star wheel would have six teeth thereon.

Figure 2:
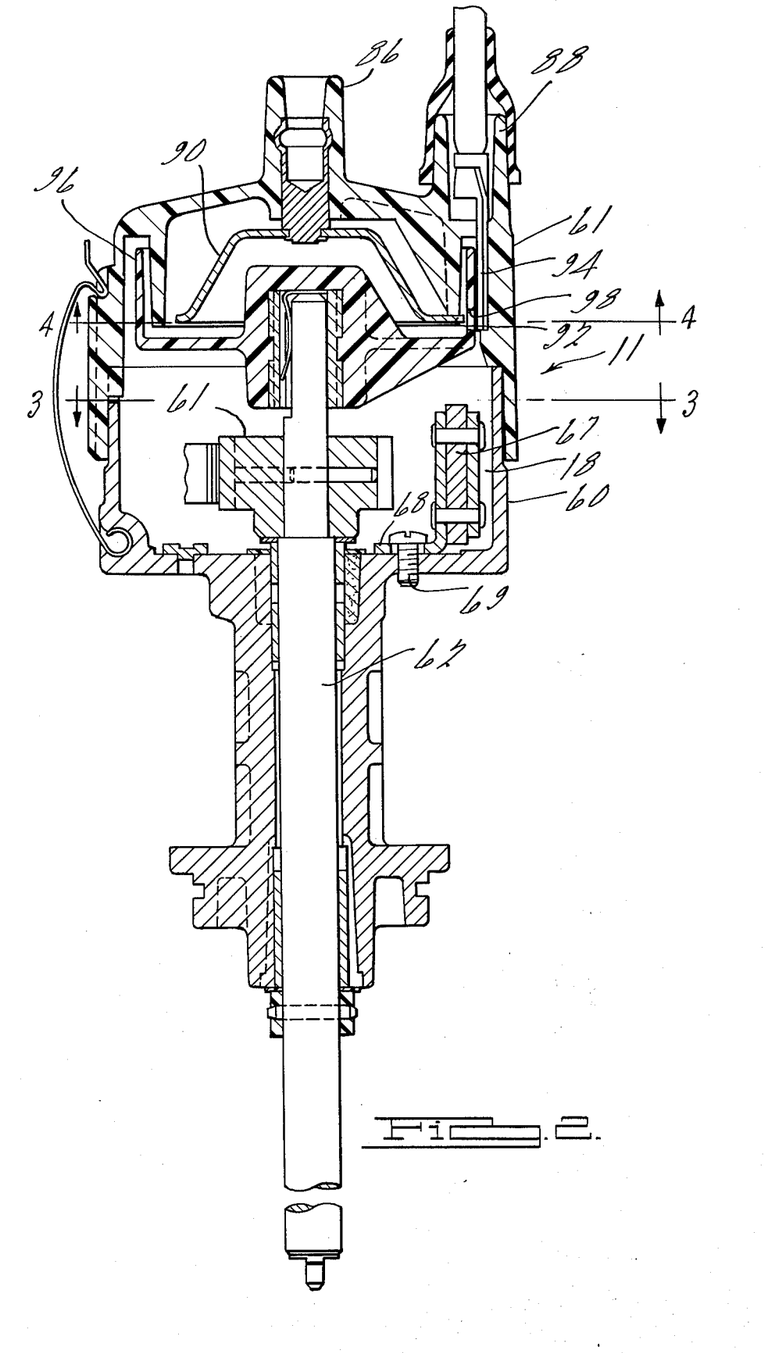
FIG. 2 is a vertical elevation sectional view of the distributor employed with the apparatus of the present invention.
Figures 3, 4:
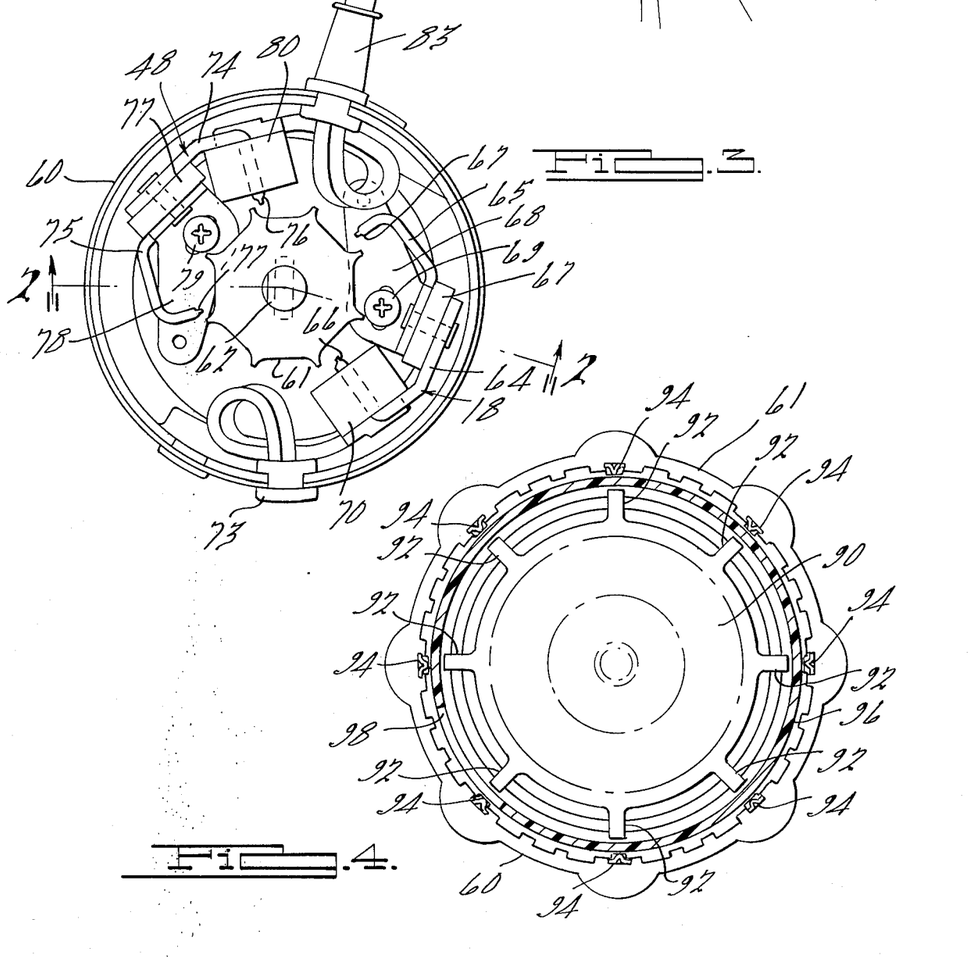
FIG. 3 is a horizontal transverse view taken in the plane 3—3 of FIG. 2 of the pickup devices.
FIG. 4 is another horizontal transverse view taken in the plane 4—4 of FIG. 2 of the distributor device illustrating the orientation of the high tension distribution electrodes; and, FIGS. 5A–C constitute a detailed schematic circuit diagram of an illustrative embodiment of the invention complying with the overall system definition of FIG. 1.

Pickup 18 comprises low-reluctance flux arms 64 and 65 defining pole tips 66 and 67, respectively. The pole tips are oriented such that the teeth of the star wheel 61 pass in closely-spaced relationship therewith and are spaced apart by the distance betwen three adjacent star wheel teeth; i.e., 90° on the wheel 61. The flux carrying arms 64 and 65 are secured together as by means of rivets passing through the two arms located on opposite sides of a permanent magnet 67', which creates a magnetic bias or fluxflow condition slotted. A bracket 68 integrally formed on one of the flux carrying arms and a fastening screw 69 are employed to secure the arrangement of arms 64 and 65 and the magnet 67' in position within the distributor 11. An output coil 70 is mounted on the arm 64 and has its coil terminals connected to a pair of conductors, which extend through an insulating bushing 73 in the lower distributor housing.

Figure 3A:
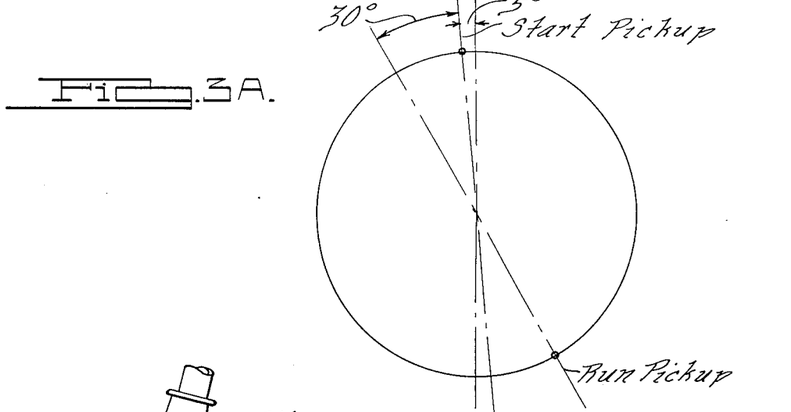
FIG. 3A depicts the angular orientation and relationship of the pickups of FIG. 3.

The start pickup 48 is identical to the run pickup 18, but is disposed on the opposite side of the distributor shaft 62 for maximum magnetic separation purposes and as depicted in FIG. 3A, is angularly displaced from the run pickup 18 by 155° in one direction and its complement or 205° in the opposite direction. The angular displacement of the pickups is a function of the difference between the reference angle setting of the run pickup 18 and the starting or crank angle setting of the start pickup 48 or (60°/2) − (10°/2) + 180° = 205° in the present embodiment.

Like the run pickup 18, the start pickup 48 comprises a pair of low-reluctance flux arms 74 and 75 defining pole tips 76 and 77 which are spaced angularly apart by 90° of star wheel rotation. A permanent magnet 77 for providing the magnetic bias is located between the flux arms 74 and 75 and the assembly is secured together by rivets, the flux arms and magnet assembly being secured to the distributor by a bracket 78 which is integrally formed on one of the arms and fastened by screw 79, as shown. Finally, an output coil 80 is mounted on the flux arm 74 and has its output conductors extending through an insulated grommet 83 in the distributor housing as shown.

Turning now to FIG. 4, additional details of the distributor 11 are shown including the physical arrangement of the high tension distributor electrodes 92 and 94 as well as the rotatable shutter 96 which accomplishes sequential spark distribution.

As illustrated therein, the distributor 11 comprises a nonconductive upper housing 61 or phenolic cap having a plurality of axially upwardly extending, tubular tower-like projections 86 and 88 which are connected by ignition cables to the high tension side of the ignition secondary coil 12 and to the spark plugs 14, respectively. Internally of the distributor cap 61 is disposed a stationary, nonrotatable conductive element 90 having a series of eight uniformly-spaced projecting fingers 92 which define the electrodes commonly connected in conductive input relationship with the ignition coil. Accordingly, each ignition pulse is applied directly to the conductive member 90 such that each of the eight projecting electrodes 92 reaches a high potential at the occurrence of each pulse. The distributor housing also carries a second plurality of eight, uniformly-spaced and separated electrodes 94 of conductive material, the electrodes 94 being disposed adjacent, but radially spaced from the fingers 92 of the member 90 so as to register therewith every 45° of angular displacement around the distributor 11. Since both electrodes 92 and 94 are stationary, it can be seen in FIG. 4 that a series of eight, radially-spaced electrode pairs are defined.

To accomplish sequential spark distribution, a shutter 96 of nonconductive, insulative material is mounted for rotation within the spark gap spacing between each of the eight pairs of electrodes 92 and 94. The shutter 96 is driven at an angular rate related to engine rotational rate by the distributor rotor shaft 62 and is provided with a window 98 which sequentially permits the opposing electrodes 92 and 94 of each electrode pair to "see" one another across an air gap, the arcuate extent of the window 98 being equal to or slightly greater than the maximum timing shift or range of spark advance over which the engine is to operate. Accordingly, the contemporaneous application of an ignition voltage pulse to the member 90 and the location of the window 98 between electrodes 92 and 94, as illustrated in FIG. 4, permits a spark to jump the gap between the electrodes which correspond in location to the window 98 but to prevent any spark from bridging the gap between any other pair of electrodes. It is, therefore, to be noted that the timing of the ignition pulses is determined entirely by the time the ignition trigger pulse is applied to the element 90. There are no means in the illustrative system for affecting the basic angular rotation relationship between the shutter 96 and the crankshaft of the engine 10 to accomplish timing control.

Looking now to FIGS. 5A–C, the circuit details of the illustrative embodiment of FIG. 1 will be given in detail, the areas of circuitry which correspond with the blocks of FIG. 1 being correspondingly numbered therein. Coil 70 of run pickup 18 is shown in FIG. 5A as provided with a tuning capacitor 100 and connected to the input of Schmitt trigger transistor 102. NPN transistor 102 has the emitter thereof grounded and the collector connected through resistor 104 to the base electrode of PNP transistor 106 whose emitter electrode is connected to +12.5 v.

The base or input electrode or transistor 102 is also connected through resistor 108 and resistor 110 to a commercially-available integrated circuit components 112 which forms part of the monostable multivibrator circuit 22 and is a Texas Instruments product indentified as Part No. SN-76810-N used in the implementation of multivibrator-type circuitry. The emitter electrode of transistor 106 is also connected through resistors 114 and 116 to pin terminal 3 and through resistors 114 and 118 to pin terminal 12 of the integrated circuit component 112. Pin terminals 8 and 12 are interconnected by means of the capacitor 120 and resistor 121, the junction between which is connected to pin terminal 10. Terminal 14 of the circuit component 112 serves as the output terminal and is connected through resistors 122 and 124 to the base and emitter electrodes, respectively, of the transistor 126. The collector electrode of transistor 126 is connected to the 12.5 volt reference through a resistor 128. The output of the transistor 126, which respresents the final stage of the multivibrator circuit 22, is connected through a resistor 130 to the negative input terminal of an operational amplifier 132 which is operated or supplied from the 25 volt supply source 32.

The operational amplifier 132 forms the major component in the pulse averaging circuit 24 and has its other or positive input terminal connected to the 12.5 volt reference through a resistor 138. The operating characteristics of the amplifier 132 are determined by the parallel connected feedback components including capacitor 134 and resistor 136. The output of operational amplifier 132 is connected through the variable resistor 140 to a second operational amplifier 142.

The second operational amplifier forms the major component in the integrator circuit 26. The opposite or positive input terminal of the amplifier 142 is connected to the 12.5 volt reference level through a resistor 144, while the center terminal of the operational amplifier 142 of the of the operational amplifier 142 of the 26 is connected to the 25 volt output level of source 32 through line 146. The feedback characteristics and reset characteristics of the operational amplifier 142 are established by means of the feedback circuit which includes the capacitor 148 and the parallel connected field-effect transistor (FET) 150.

FET transistor 150 functions as the reset device and has the control electrode thereof interconnected with the pin terminal 8 of the integrated circuit component 112 in the monostable multivibrator circuit 22 by way of a capacitor 152, transistor 154, and resistor 156, as shown. Again, the collector electrode of transistor 154 in the reset circuit 27 is connected to the 25 volt supply source 32 by way of the resistor 158. Resistor 160 operates to achieve the proper bias between the collector and the base electrodes of transistor 154.

As previously indicated, the output of integrator circuit 26 is a repeating, negative going signal, the instantaneous amplitude of which during any repetition is an indication of the physical angular rotational position $\theta$ of the engine 10. This signal is connected through a resistor 162 to the summing junction 28, which is best viewed as a current summing junction and which is connected by conductor 163 directly to the negative input terminal of an operational amplifier 164, which forms part of the comparator circuit 34 shown schematically in FIG. 5B and is operated from the 25 volt supply source 32. The summing function may then be considered as occurring in the comparator viewed as a summing comparator.

The other terminal of the operational amplifier 164 is connected to the 12.5 reference by way of resistor 169.

Figure 5A:
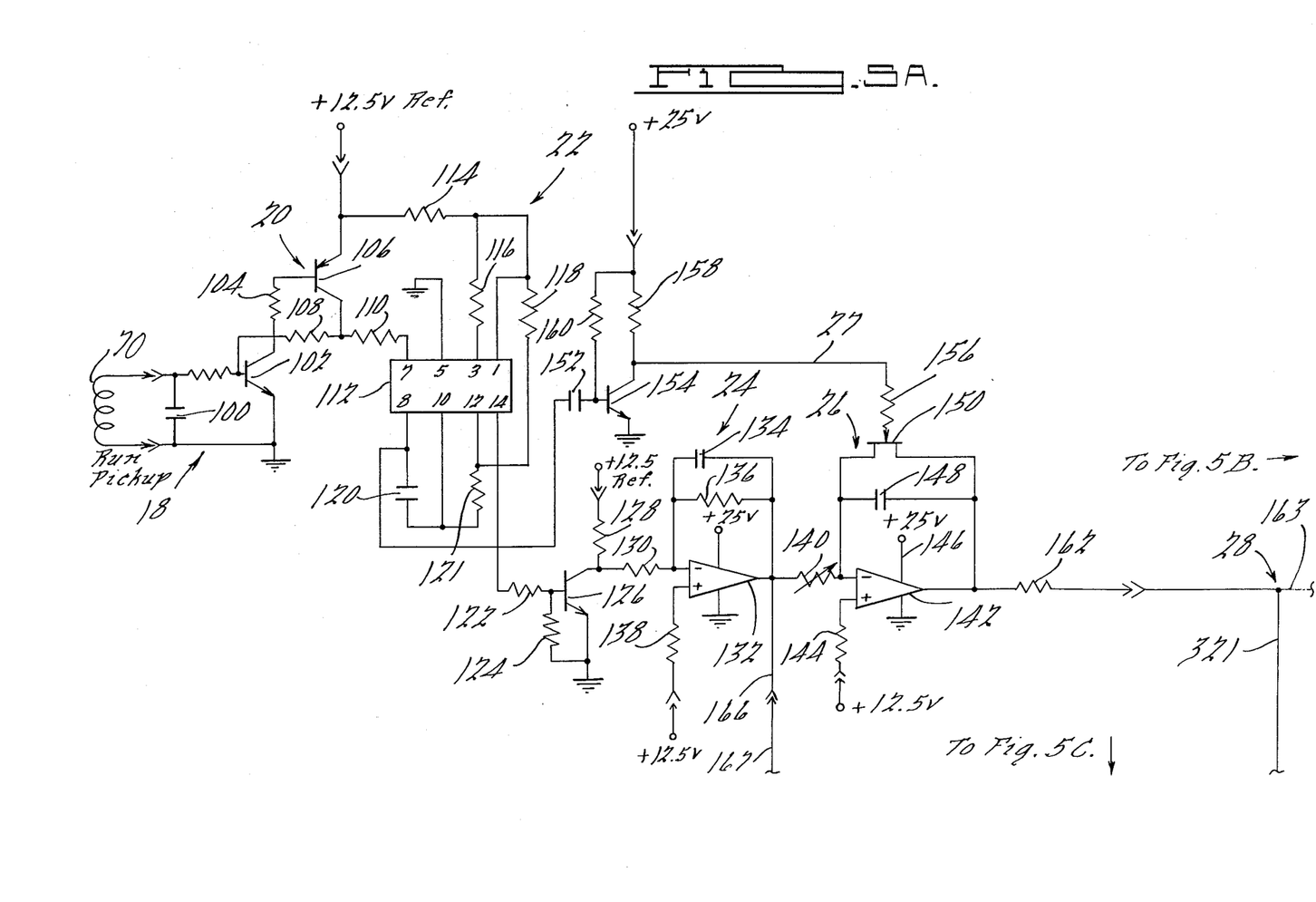
Figure 5B:
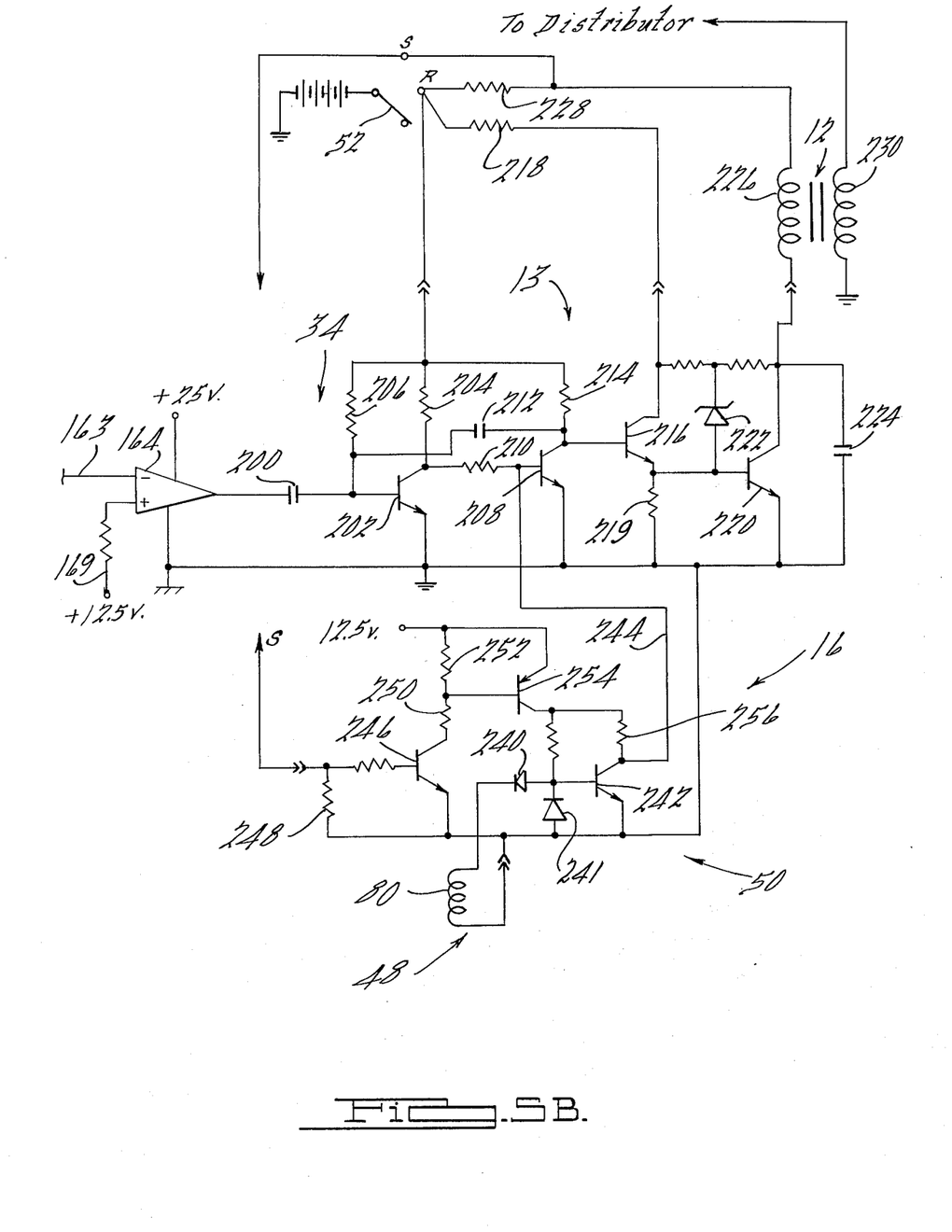
Figure 5C:
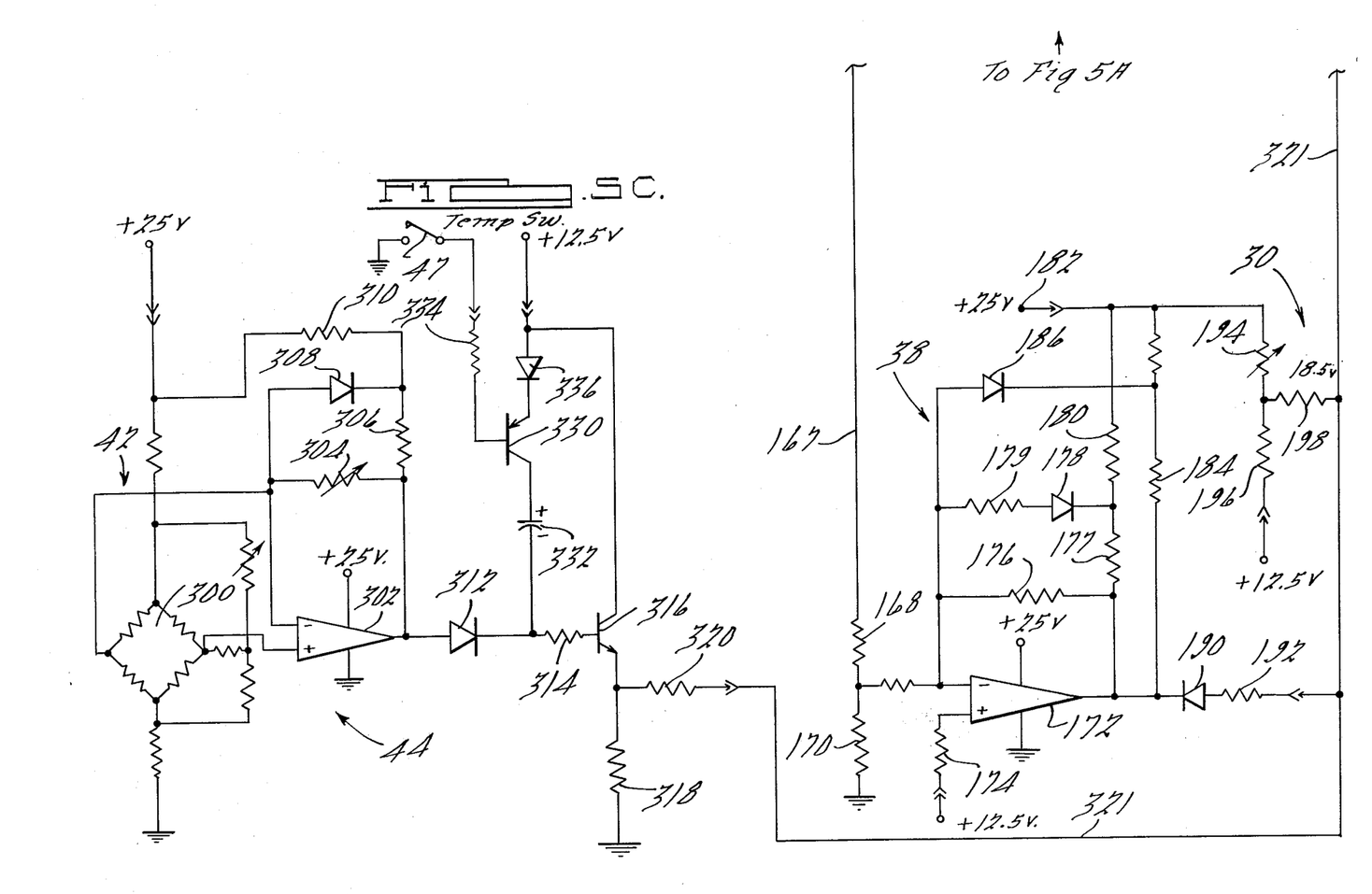

As shown in FIGS. 5A and 5C, the output of the operational amplifier 132 in the pulse averager 24 is also connected by conductors 166 and 167 and by way of a voltage divider comprising resistors 168 and 170 in FIG. 5C to the negative input of an operational amplifier 172, which forms the principal component in the speed governor circuit 38. The positive input terminal of the operational amplifier 172 is connected through a resistor 174 to the 12.5 volt reference. As previously indicated, it is the function of the speed governor circuit 38 to provide a broken or discontinuous transfer function, thus to accomplish specific predetermined rates of spark advance at predetermined engine operating speeds approximating the customary engine governor advance characteristic shown at 38b in FIG. 1. This function or transfer characteristic is implemented in the apparatus of the present invention by the use of diodes responding to various breakdown levels. Accordingly, the feedback paths for the operational amplifier 172 comprise a resistor 176 connected in parallel with a serially connected resistor 177, a first diode 178, and resistor 179. The cathode electrode of the diode 178 is connected through a resistor 180 to the 25 volt reference point 182. In addition, the output of the operational amplifier 172 is connected through resistor 184 and a second diode 186 to the negative input thereof, the feedback path 184, 186 being connected in parallel to the feedback path made up of the parallel combination of elements 176, 177, 178 and 179. The output of the operational amplifier 172 is connected through a third diode 190 and a resistor 192 to the summing junction 28 via conductor 321.

The 18.5v dc bias 30 used for the establishment of the basic or TDC timing relationship is provided by means of the 25 volt supply connection 182 and a voltage divider made up of resistors 194 and 196 of FIG. 5C. The midpoint of the two resistors 194 and 196 is connected by means of a resistor 198 and conductor 321 to the summing junction 28 shown in FIG. 5A so as to provide at line 321 approximately 18.5 volts. This voltage is preferably a factory-set parameter, but may be adjusted within limits by varying resistor 194. Again, the 18.5 volt figure is helpful in obtaining the overall view of the operation of the summing junction, but those skilled in the art will recognize that the most thorough analysis of the operation of the summing of signals at the junction 28 is afforded by means of the typical current summing theories of electrical engineering.

With reference to FIG. 5B, the output of the operational amplifier 164, which forms the principal component in the comparator 34, is connected to the solid state ignition control unit 13, as shown. The output of operational amplifier 164 is connected through a coupling capacitor 200 to apply a negative-going voltage spike to the base electrode of NPN transistor 202. Transistor 202 is biased so as to be normally on by means of a collector resistor 204 and a base bias resistor 206, while its emitter is connected to power and signal ground as shown. The ignition circuit 13 further comprises a transistor 208 having the base or input electrode thereof interconnected with the collector electrode of transistor 202 by means of a resistor 210.

Accordingly, transistor 208 is turned on as the transistor 202 turns off. The circuit, including transistor 208 operates as a monostable or one-shot circuit by means of the capacitive coupling 212 between the collector of transistor 208 and the base of transistor 202. In addition, an RC time constant and positive feedback latch is provided by the resistors 214 and 206, which are connected between the collector electrode of transistor 108 and the base or input electrode of transistor 202. The collector electrode of transistor 208 is connected to the base electrode of a transistor 216, the collector which is connected through a 4 ohm ballast resistor 218 to the vehicle power source through the run (R) contact of the ignition switch 52. The emitter electrode of transistor 216 is connected to ground by way of resistor 219 and also to the input or base electrode of a transistor 220. Limitations on the current and voltage applicable across the primary electrodes of transistor 216 is accomplished by means of a Zener diode 222 which is connected across the transistor terminals, as shown. It will be appreciated that as transistor 208 turns on, the transistors 216 and 220 turn off. A capacitor 224 is connected across the primary electrodes of transistor 220. The collector electrode of transistor 220 is connected in series with the ignition system primary coil 226 and ballast resistor 228, which is connected to the start and run contacts of the ignition switch as shown. Primary coil 226 is magnetically coupled with the ignition secondary coil 230 which is interconnected directly with the element 90 of the distributor 11, as shown in FIG. 4.

Looking now to the system 16 for providing ignition pulses during the starting operation, it can be seen that the coil 80 of the "start" pickup 48 has one end thereof connected through a diode 240 to the base electrode of a transistor 242 and the other end thereof connected directly to the emitter electrode of the transistor 242. A diode 241 is connected directly across the base-emitter junction of the transistor 242. The collector electrode of transistor 242 is connected by way of line 244 to the base of control electrode of transistor 208 in the ignition circuit 13 so as to override the operation of the "run" ignition pulses to the extent they are applied to the ignition circuit 13 during a starting or cranking operation. The transfer circuit 50 further comprises a starting switch 52 which connects the vehicle battery source to the input electrode of an NPN type control transistor 246, the emitter of which is connected to ground. Base emitter bias is accomplished by means of a resistor 248. The collector electrode of transistor 246 is connected through resistors 250 and 232 to a 12.5 volt reference point. In addition, transfer circuit 50 comprises a transistor 254 of the PNP type, the emitter of which is connected to the 12.5 supply, its base connected to the junction between the resistors 250 and 232 and the collector of which is connected by way of resistor 256 to the collector of transistor 242.

In operation, the closure of the switch 52 by rotating the ignition key to the start position in the ordinary and conventional automotive ignition arrangement applies battery voltage to the base electrode of transistor 146 turning that transistor on. This decreases the base voltage on transistor 254, turning that transistor on and increases the voltage at the collector and base of transistor 242. Transistor 242 turns on, thus, turning transistor 208 on and overriding any further operation of the output of comparator 34 in affecting the operation of the ignition circuit 13. Each pulse generated in the start pickup coil 80 turns transistor 242 momentarily off and reverses the conductivity of transistor 208 in the ignition circuit 13. This has the effect of generating ignition trigger signals of fixed timing in the ignition circuit 13 through transistors 208, 216, and 220. The flow of current through ignition primary coil 226 induces a high-voltage pulse of approximately 700 microseconds duration in the secondary coil 230.

The vacuum transducer 42 and the vacuum advance program circuit 44 from FIG. 1 are illustrated in schematic detail in FIG. 5C. The vacuum transducer 42 is shown as a conventional bridge-type strain gauge 300 having input terminals connected across the 25-volt source 32 and output terminals connected across the inputs of an operational amplifier 302. The amplifier 302 forms part of the vacuum advance program circuit 44 and includes substantially parallel-connected feedback elements including variable resistor 304 and the series combination of a resistor 306 and diode 308. In addition, a feedback resistor 310 is connected between the cathode electrode of diode 308 and the 25 volt source, as shown. The output of the amplifier 302 is coupled through and isolation diode 312 and a resistor 314 to the input of a control transistor 316 having the collector thereof connected to the 12.5 volt reference source. The emitter electrode of transistor 316 is connected through a resistor 318 to ground and through a resistor 320 and conductor 321 to the current summing junction 28 in FIG. 5A. Accordingly, the combination of circuit elements 42 and 44 establishes a 12.5 volt reference for the vacuum signal source and a decreasing signal for increasing pressure, this signal being directly applicable to the current summing junction 28 to control spark advance during variable pressure operating conditions of the engine 10.

Various other advance control functions can be connected directly to the current summing junction 28 according to various engine operating condition parameters as desired, such other advance sources being generally designated by 56 in FIG. 1.

The delay advance controller 46 is shown in FIG. 5C connected in the output of the vacuum advance program unit 44 and comprises PNP transistor 330, timing capacitor 332, resistor 334, NPN transistor 316 and discharge resistor 318. The base of transistor 330 is connected through a current limiting resistor 314 to one side or contact of a remotely located temperature switch 47, the other side or contact of which is connected to apply signal ground to the base of transistor 330 through resistor 314 when the ambient temperature is above 68° F. The emitter of transistor 330 is connected through diode 336 to the + 12.5 volt reference level from power supply.

In operation, the voltage at output of the operational amplifier 302 of the vacuum advance program unit 44 varies from 12.5 volts at zero vacuum prevailing under vehicle acceleration conditions to 3.5 volts at maximum or full vacuum advance prevailing at no load, idle, deceleration and cruising conditions.

With termperature switch 47 closed, transistor 330 conducts and maintains the upper side or plate of capacitor 332 at the potential of the collector of transistor 330. The other side or plate of C332 is at a potential one diode drop below the output of operational amplifier 302, which is at the aforementioned level of 3.5 v. during vehicle no load, cruise, deceleration or idle conditions. Thus, C332 will be charged in the direction and with the polarities shown under these conditions.

When the vehicle is accelerated, the voltage at the output of the operational amplifier 302 rises to + 12.5 volts discharging any accumulated charge on C332 therethrough. Upon completion of the acceleration mode and return to a no-load operating condition, the voltage at the output of the operational amplifier drops to + 3.5 volts, permitting C332 to charge through R314, the base-emitter junction of emitter follower transistor 316 and R318 to signal ground. The charging time interval is related to C332 (R314 + B.R318) where B is the amplification factor of transistor 316 and in the delay advance control application of the present invention is selected to provide a delay of from 10–15 seconds herein.

It is to be understood that the foregoing description is illustrative in character being referred to a specific and preferred, but illustrative embodiment of the invention.

What is claimed is:

1. In an electronic ignition system for an emissions controlled internal combustion engine; electronic means for forming electrical ignition pulses in response to input signals; a first transducer for producing input signals to said electronic means at a rate related to the rotational speed of the engine and during running operation of the engine; and a second transducer equivalent to and angularly spaced from said first transducer in the direction of engine rotation for producing input signals to said electronic means at a rate related to engine speed during a starting phase of engine operation, and operator controlled means for causing said signals from said second transducer to override the signals from said first transducer and advance the timing of the engine during starting thereof for emission reduction purposes.

2. In a system as defined in claim 1 means for varying the timing of said ignition pulses relative to said input signals from the first transducer according to enginespeed and load.

3. An electronic spark timing ignition controller for an emission controlled internal combustion engine comprising in combination, a first electronic timing control channel operative during engine idle and running conditions and producing a variable spark timing advance of the firing of the engine from an initial angular firing position of the engine, said first channel including first transducer means responsive to engine rotation and having a first predetermined angular positional relationship to said initial angular firing position of the engine, a normally disabled second electronic timing control channel including second transducer means responsive to engine rotation and having a second predetermined angular positional relationship to said initial angular firing position of the engine and angularly spaced from said first transducer for producing a fixed spark timing control of the firing of the engine at said second predetermined angular position in advance of said initial angular firing position of the engine, and an operator controlled transfer means enabling said second electronic control channel and overriding said first timing control channel during the cranking phase of the engine, whereby said engine is operated during cranking at said second predetermined angular position in advance of said initial angular firing position of the engine and said engine is operated at idle after cranking at said initial angular firing position which is retarded relative to said second angular firing position and from which the spark timing may be advanced during off-idle engine running conditions.

4. A double-channel spark timing ignition controller in accordance with claim 3 wherein said first and second transducer means are relatively angularly spaced apart an amount corresponding to the difference between said first and second predetermined angular positions.

5. A double-channel spark timing ignition controller in accordance with claim 4 wherein said first and second transducer means each include a stationary electrical pickup separated by the aforesaid angular spacing relationship and share a common reluctor wheel driven at a rate proportional to the rotational speed of the engine and having a number of teeth thereon corresponding to the number of cylinders of the engine.

6. A double-channel spark timing ignition controller in accordance with claim 5 wherein said engine includes an ignition distributor housing said first and second transducer means and said reluctor wheel which is driven by the distributor shaft.

7. An electronic ignition system for an emissions controlled internal combustion engine in a vehicle comprising: means responsive to engine rotation for generating a first repeating signal quantity which varies during each repetition thereof as a function of the instantaneous rotational position of the engine in the operating cycle thereof; means for modulating the first signal quantity in accordance with an engine operating parameter; means for comparing the modulated first signal quantity to a substantially fixed reference signal quantity of a value to produce an ignition trigger signal when each modulated repetition of said first signal quantity bears a predetermined relationship to said reference signal quantity value; said engine operating parameter being engine load as manifested by engine vacuum and sensed by pressure responsive transducer means generating an electrical signal responsive to engine vacuum; signal scaling means connected between said pressure transducer means and said modulating means to provide a signal transfer function corresponding to the general vacuum advance characteristic of an internal combustion engine; and electronic time delay means connected between said signal scaling means and said modulating means to delay for a predetermined time interval the timing advance otherwise called for by said signal scaling transfer function characteristic means during the transition from an engine load condition to a no-load condition.

8. An electronic ignition system in accordance with claim 7 wherein said signal scaling means comprises an operational amplifier including diode-biased feedback circuits connected between the output and input thereof.

9. An electronic ignition system for an emissions controlled internal combustion engine comprising:

a first source of ignition trigger signals including first means responsive to engine rotation for generating a first repeating signal quantity which varies during each repetition thereof as a function of the instantaneous rotational position of the engine in the operating cycle thereof, said means comprising transducer means for producing a d-c signal related to engine speed, integrator means connected to receive said d-c signal and means for repeatedly resetting said integrator means at predetermined engine rotation intervals;

means for varying the occurrence of said ignition trigger signals from said first source relative to a predetermined angular position of the engine including means for modulating said first signal quantity in accordance with engine operating parameters, including speed and load;

means for comparing the modulated first signal quantity to a substantially fixed reference signal quantity of a value to produce an ignition trigger signal when each modulated repetition of said signal quantity bears a predetermined relationship to said reference signal quantity value, a second source of ignition trigger signals separate and independent from said first mentioned means and said comparing means to produce an ignition trigger signal occurring at a fixed angular position of the engine, and operator controlled means for operating said second source during a starting phase of engine operation.

10. An electronic ignition system in accordance with claim 9 wherein said second source of ignition trigger signals includes a second transducer angularly spaced from the first transducer to produce ignition trigger pulses having a timing occurrence in advance of said predetermined initial angular firing position of the engine.

11. An electronic ignition system for an internal combustion engine comprising:

means responsive to engine rotation for generating a first repeating signal quantity which varies during each repetition thereof as a function of the instantaneous rotational angular position of the engine in the operating cycle thereof including, means for producing a dc signal related to engine speed, integrator means connected to receive said dc signal and to integrate the same, and means for repeatedly resetting said integrator means at predetermined engine rotation intervals to produce said first signal quantity;

means for modulating the first signal quantity in accordance with an engine operating parameter; and means for comparing the modulated first signal quantity to a substantially fixed reference signal quantity of a preselected value independent of engine speed to produce an ignition trigger signal when each modulated repetition of said first signal quantity bears a predetermined relationship to said reference signal quantity value.

12. An electronic ignition system as set forth in claim 11 wherein said modulating means comprises a current-summing junction connected to receive said dc speed signal and said first signal quantity.

13. An electronic ignition system as set forth in claim 12 including at least one additional signal quantity generator for producing a second signal quantity related to engine operation; said additional generator having an output connected to said junction to further modulate the first signal quantity thereby to vary ignition timing.

14. An ignition system as defined in claim 13 wherein said second signal quantity is related to engine vacuum.

15. An ignition system as defined in claim 12 further including an operational amplifier connected between the means for producing the dc speed signal and the summing junction to provide a voltage-speed transfer function having at least one break point.

16. An electronic ignition system for an emission-controlled internal combustion engine comprising:

means responsive to engine rotation for generating a first signal quantity whose amplitude varies with engine speed and a second signal quantity whose amplitude varies independently of engine speed as a function of the instantaneous angular rotational position of the crankshaft of the engine and including signal pulse generating means having a predetermined angular positional setting relative to the engine crankshaft and driven thereby for producing a train of pulses having a repetition rate related to engine speed, pulse shaping means connected to said pulse generating means and integrator means coupled to said signal pulse generating means and electrically reset by a pulse therefrom at said predetermined angular positional setting of said signal pulse generating means relative to the engine crankshaft;

means for comparing said engine angular position signal quantity with a reference signal quantity of a predetermined fixed value independent of engine speed to produce an ignition trigger signal when said engine angular position signal quantity attains a predetermined relationship to said reference signal quantity, said reference signal quantity corresponding to the value of said engine angular position signal quantity at a predetermined initial angular position of the engine from which it is desired to advance the firing of the engine after starting and during engine running conditions;

means for generating a third signal quantity related to an engine operating parameter and for applying said third signal quantity to said comparing means directly with said first signal quantity, said second signal quantity and said reference signal quantity for modifying the occurrence of the engine ignition triggger signal produced at said predetermined initial angular firing position in accordance with said first and third signal quantities, and electronic time delay means connected between said third signal generating means and said comparing means for delaying the effect of said third signal quantity on said ignition trigger signal in response to a change in the engine operating parameter.

17. An electronic ignition system in accordance with claim 16 wherein said pulse shaping means includes a Schmitt trigger circuit.

18. An electronic ignition system as set forth in claim 11 wherein said generating means further includes a first transducer for producing electrical signal pulses at a rate related to engine speed.

19. An electronic ignition system as set forth in claim 18 wherein said transducer comprises a low reluctance element which rotates at a rate proportional to engine speed, and an electromagnetic pickup disposed adjacent said element and magnetically linked therewith for producing said pulses.

20. An electronic ignition system in accordance with claim 18 wherein said generating means further includes signal shaping means and signal averaging means connected between said speed transducer means and said integrating means.

21. An electronic ignition system in accordance with claim 20 wherein said integrator means is reset from said signal shaping means every $2\omega/c$ degrees of engine rotation where $\omega = 2\pi$ radians and $C$ is the number of engine cylinders.

22. An electronic ignition system in accordance with claim 11 wherein said signal shaping means includes a Schmitt trigger and a univibrator circuit and wherein said integrator means is reset from said univibrator.

23. In an electronic spark timing advance controller for an emission-controlled internal combustion engine, the combination of means responsive to engine rotation for generating a first repeating signal quantity which varies during each repetition thereof as a function of the instantaneous angular rotational position of the engine from a first value at a first preselected angular position of the engine to a second value at a second preselected angular position of the engine and for resetting said first signal quantity at said second preselected angular position of the engine, means for comparing said first engine angular position signal quantity against a fixed reference signal quantity of a predetermined value independent of engine speed to produce an ignition trigger signal when said first engine angular position signal quantity attains a predetermined relationship to said reference signal quantity, said fixed reference signal quantity corresponding to the value of said first engine angular position signal quantity at a predetermined initial angular position of the engine at which it is desired to produce ignition trigger signals to fire the engine at no-load, engine idling conditions, means for generating a second signal quantity and a third signal quantity each respectively related to engine load as manifested by engine vacuum and to engine speed, and for applying said second and third signal quantities to said comparing means with said first signal quantity and said reference signal quantity for modifying the occurrence of the engine ignition trigger signals from said predetermined initial angular firing position of the engine in accordance with said second and third signal quantities, and electronic time delay means connected between said second signal generating means and said comparing means for time delaying the effect of said second signal quantity on said ignition trigger signal in response to a change in engine load.

24. An electronic ignition system in accordance with claim 23 further including ambient temperature sensing means operative above a predetermined ambient temperature and connected to said delay advance means to disable operation thereof at temperatures below a predetermined ambient temperature.

25. An electronic ignition control system for an emissions controlled internal combustion engine, comprising in combination a first source of ignition trigger signals to produce ignition signals of variable timing occurrence in the operating cycle of the engine in accordance with selected engine operating parameters including first means for generating a first repeating signal quantity which varies during each repetition thereof as a function of the instantaneous angular rotational position of the engine from a first value at a first preselected angular position of the engine to a secondary value at a second preselected angular position thereof, said first means comprising first transducer means responsive to engine rotation for producing electrical signal pulses at a rate related to engine speed, means for producing a dc signal related to engine speed, integrator means connected to receive said dc signal, and means for repeatedly resetting said integrator means from said first transducer means at predetermined engine rotation intervals corresponding to said second preselected angular position of the engine. means for comparing the first signal quantity to a substantially fixed reference signal quantity of a value to produce an ignition trigger signal when said first engine angular position signal quantity attains a predetermined relationship to said reference signal quantity value, said reference signal quantity corresponding to the value of said first angular position signal quantity at a predetermined initial angular position of the engine at predetermined engine rotation intervals corresponding to said second preselected angular position of the engine, means for comparing the first signal quantity to a substantially fixed reference signal quantity of a value to produce an ignition trigger signal when said first engine angular position signal quantity attains a predetermined relationship to said reference signal quantity value, said reference signal quantity corresponding to the value of said first angular position signal quantity at a predetermined initial angular position of the engine at which it is desired to produce said ignition trigger signals to fire the engine at no-load engine idling conditions, and means for varying the occurrence of said ignition trigger signals from said comparing means in accordance with engine speed and load operating parameters including means for generating a second signal quantity related to engine load as manifested by engine vacuum and for applying said second signal quantity and said engine speed related dc signal to said comparing means with said first signal quantity and said reference signal quantity;

a second source of ignition trigger signals including second transducer means angularly spaced from said first transducer means to produce an ignition trigger signal occurring at a fixed angular position of the engine in advance of the said predetermined initial engine idling, no-load firing angular position of the engine; and operator controlled means for operating said second source of ignition trigger signals only during a starting phase of engine operation.

* * * * *

UNITED STATES PATENT OFFICE
CERTIFICATE OF CORRECTION

PATENT NO. : 3,910,243
DATED : October 7, 1975
INVENTOR(S) : LEONARD P. GAU, et al It is certified that error appears in the above-identified patent and that said Letters Patent are hereby corrected as shown below:

Patent Claim 25, Column 18, lines 19-30, cancel the phrase
". means for comparing the first signal quantity to a substantially fixed reference signal quantity of a value to produce an ignition trigger signal when said first engine angular position signal quantity attains a predetermined relationship to said reference signal quantity value, said reference signal quantity corresponding to the value of said first angular position signal quantity at a predetermined initial angular position of the engine at predetermined engine rotation intervals corresponding to said second preselected angular position of the engine,"

Signed and Sealed this eighteenth Day of May 1976

[SEAL]

Attest:

RUTH C. MASON
Attesting Officer

C. MARSHALL DANN
Commissioner of Patents and Trademarks